United States Patent
Yu et al.

(10) Patent No.: US 12,446,006 B2
(45) Date of Patent: Oct. 14, 2025

(54) METHOD AND USER EQUIPMENT FOR PERFORMING SIDELINK COMMUNICATION

(71) Applicant: SHARP KABUSHIKI KAISHA, Sakai (JP)

(72) Inventors: Chia-Hao Yu, Taipei (TW); Yung-Lan Tseng, Taipei (TW); Hsin-Hsi Tsai, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 417 days.

(21) Appl. No.: 17/926,712

(22) PCT Filed: May 20, 2021

(86) PCT No.: PCT/CN2021/094959
§ 371 (c)(1),
(2) Date: Nov. 21, 2022

(87) PCT Pub. No.: WO2021/233392
PCT Pub. Date: Nov. 25, 2021

(65) Prior Publication Data
US 2023/0247550 A1 Aug. 3, 2023

Related U.S. Application Data

(60) Provisional application No. 63/031,510, filed on May 28, 2020, provisional application No. 63/028,502, filed on May 21, 2020.

(51) Int. Cl.
*H04W 72/02* (2009.01)
*H04L 1/1822* (2023.01)
(Continued)

(52) U.S. Cl.
CPC .......... *H04W 72/02* (2013.01); *H04L 1/1822* (2013.01); *H04W 52/0216* (2013.01);
(Continued)

(58) Field of Classification Search
CPC ............. H04W 72/02; H04W 52/0216; H04W 52/0229; H04W 52/0241; H04W 76/28; H04W 72/23; H04L 1/1822; Y02D 30/70
See application file for complete search history.

(56) References Cited

U.S. PATENT DOCUMENTS

2019/0052416 A1  2/2019  Babaei et al.
2019/0098520 A1  3/2019  Kim
(Continued)

FOREIGN PATENT DOCUMENTS

CN  106028427 A  10/2016
CN  109792364 A  5/2019
(Continued)

OTHER PUBLICATIONS

3GPP TSG RAN WG2 Meeting #108; R2-1915106; Source: Lenovo, Motorola Mobility; Title: SL HARQ protocol operation; Reno, USA, Nov. 18-22, 2019. (Year: 2019).*
(Continued)

*Primary Examiner* — Mohammed S Chowdhury
(74) *Attorney, Agent, or Firm* — ScienBiziP, P.C.

(57) ABSTRACT

A method and a User Equipment (UE) for performing Sidelink (SL) communication are provided. The method includes performing an SL transmission based on a first set of timers configured for controlling SL Discontinuous Transmission (DTX) behaviors of the UE; and performing an SL reception based on a second set of timers configured for controlling SL Discontinuous Reception (DRX) behaviors of the UE, wherein at least one first timer value of the
(Continued)

first set of timers is independently configured relative to at least one second timer value of the second set of timers.

12 Claims, 9 Drawing Sheets

(51) Int. Cl.
*H04W 52/02* (2009.01)
*H04W 76/28* (2018.01)

(52) U.S. Cl.
CPC ... *H04W 52/0229* (2013.01); *H04W 52/0241* (2013.01); *H04W 76/28* (2018.02)

(56) References Cited

U.S. PATENT DOCUMENTS

| | | | |
|---|---|---|---|
| 2019/0116626 A1 | 4/2019 | Zhao | |
| 2021/0014791 A1 | 1/2021 | Freda et al. | |
| 2023/0115633 A1* | 4/2023 | Park | H04W 72/0446 370/311 |
| 2023/0164696 A1* | 5/2023 | Yang | H04W 52/0216 370/311 |
| 2023/0164768 A1* | 5/2023 | Park | H04W 76/28 370/329 |

FOREIGN PATENT DOCUMENTS

| | | |
|---|---|---|
| EP | 3499975 A1 | 6/2019 |
| WO | 2015169405 A1 | 11/2015 |

OTHER PUBLICATIONS

ZTE: "Discussion on PC5 DRX", 3GPP Draft; R2-1704634, 3GPP TSG-RAN WG2 Meeting #98, Hangzhou, China, May 15-19, 2017 (May 5, 2017).

3GPP TS 38.213 V16.1.0 (Mar. 2020), 3rd Generation Partnership Project; Technical Specification Group Radio Access Network; NR; Physical layer procedures for control (Release 16).

3GPP TS 38.214 V16.1.0 (Mar. 2020), 3rd Generation Partnership Project; Technical Specification Group Radio Access Network; NR; Physical layer procedures for data (Release 16).

3GPP TS 36.213 V16.0.0 (Dec. 2019), 3rd Generation Partnership Project; Technical Specification Group Radio Access Network; Evolved Universal Terrestrial Radio Access (E-UTRA); Physical layer procedures (Release 16).

Huawei et al., "Signaling based mechanisms for UE power saving", R1-1810155, 3GPP TSG RAN WG1 Meeting #94bis, Chengdu, China, Oct. 8-12, 2018.

* cited by examiner

METHOD AND USER EQUIPMENT FOR PERFORMING SIDELINK COMMUNICATION

CROSS-REFERENCE TO RELATED APPLICATION(S)

The present application is a National Stage application of International Patent Application Serial No. PCT/CN2021/094959, filed on May 20, 2021, which claims the benefit of and priority to U.S. Provisional Patent Application Ser. No. 63/031,510, filed on May 28, 2020, and U.S. Provisional Patent Application Ser. No. 63/028,502, filed on May 21, 2020. The contents of all of the above-referenced applications are hereby fully incorporated herein by reference for all purposes.

FIELD

The present disclosure generally relates to wireless communication and, more particularly, to a method and a user equipment (UE) for performing Sidelink (SL) communication.

BACKGROUND

With the tremendous growth in the number of connected devices and the rapid increase in user/network traffic volume, various efforts have been made to improve different aspects of wireless communication for the next-generation wireless communication system, such as fifth-generation (5G) New Radio (NR), by improving data rate, latency, reliability, and mobility.

The 5G NR system is designed to provide flexibility and configurability to optimize network services and types, accommodating various use cases such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communication for the next-generation wireless communication system.

SUMMARY

The present disclosure is directed to a method and a User Equipment (UE) for resource selection approach adaptation.

According to an aspect of the present disclosure, a method performed by a UE for Sidelink (SL) communication is provided. The method includes performing an SL transmission based on a first set of timers configured for controlling SL Discontinuous Transmission (DTX) behaviors of the UE; and performing an SL reception based on a second set of timers configured for controlling SL Discontinuous Reception (DRX) behaviors of the UE, wherein at least one first timer value of the first set of timers is independently configured relative to at least one second timer value of the second set of timers.

According to another aspect of the present disclosure, a UE for performing SL communication is provided. The UE includes a transceiver, at least one memory storing computer-executable instructions, and at least one hardware processor coupled to the transceiver and to the at least one memory. The computer-executable instructions, when executed by the at least one hardware processor, cause the UE to perform, by the transceiver, an SL transmission based on a first set of timers configured for controlling SL DTX behaviors of the UE; and to perform, by the transceiver, an SL reception based on a second set of timers configured for controlling SL DRX behaviors of the UE, wherein at least one first timer value of the first set of timers is independently configured relative to at least one second timer value of the second set of timers.

BRIEF DESCRIPTION OF THE DRAWINGS

Aspects of the example disclosure are best understood from the following detailed description when read with the accompanying figures. Various features are not drawn to scale. Dimensions of various features may be arbitrarily increased or reduced for clarity of discussion.

DETAILED DESCRIPTION

Figure 1:
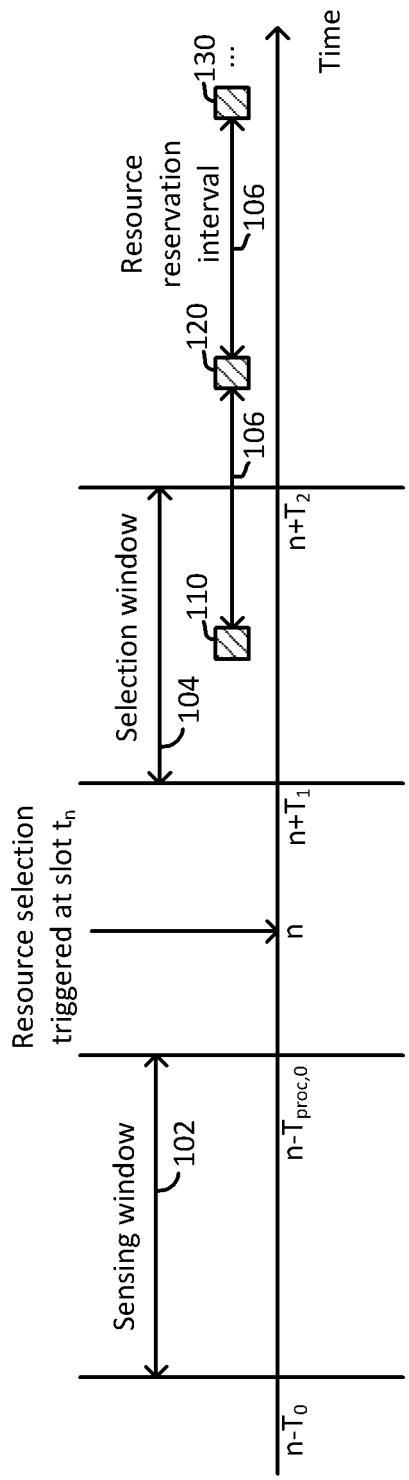
FIG. 1 illustrates a process of full sensing-based resource selection, according to an implementation of the present disclosure.

The following contains specific information related to implementations of the present disclosure. The drawings and their accompanying detailed description are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purposes of consistency and ease of understanding, like features may be identified (although, in some examples, not illustrated) by the same numerals in the drawings. However, the features in different implementations may differ in other respects and shall not be narrowly confined to what is illustrated in the drawings.

The phrases "in one implementation," or "in some implementations," may each refer to one or more of the same or different implementations. The term "coupled" is defined as connected, whether directly or indirectly via intervening components, and is not necessarily limited to physical connections. The term "comprising" means "including, but not necessarily limited to" and specifically indicates open-ended inclusion or membership in the disclosed combination, group, series, or equivalent. The expression "at least one of A, B and C" or "at least one of the following: A, B and C" means "only A, or only B, or only C, or any combination of A, B and C."

The terms "system" and "network" may be used interchangeably. The term "and/or" is only an association relationship for disclosing associated objects and represents that three relationships may exist such that A and/or B may indicate that A exists alone, A and B exist at the same time, or B exists alone. "A and/or B and/or C" may represent that at least one of A, B, and C exists. The character "/" generally represents that the associated objects are in an "or" relationship.

For the purposes of explanation and non-limitation, specific details, such as functional entities, techniques, protocols, standards, and the like, are set forth for providing an understanding of the disclosed technology. In other examples, detailed disclosures of well-known methods, technologies, systems, architectures, and the like are omitted so as not to obscure the present disclosure with unnecessary details.

Persons skilled in the art will immediately recognize that any disclosed network function(s) or algorithm(s) may be implemented by hardware, software, or a combination of software and hardware. Disclosed functions may correspond to modules which may be software, hardware, firmware, or any combination thereof.

A software implementation may include computer-executable instructions stored on a computer-readable medium, such as memory or other type of storage devices. One or more microprocessors or general-purpose computers with communication processing capability may be programmed with corresponding computer-executable instructions and perform the disclosed network function(s) or algorithm(s).

The microprocessors or general-purpose computers may include Application-Specific Integrated Circuits (ASICs), programmable logic arrays, and/or one or more Digital Signal Processors (DSPs). Although some of the disclosed implementations are oriented to software installed and executing on computer hardware, alternative implementations implemented as firmware, as hardware, or as a combination of hardware and software are well within the scope of the present disclosure. The computer-readable medium may include, but is not limited to, Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture, such as a Long-Term Evolution (LTE) system, an LTE-Advanced (LTE-A) system, an LTE-Advanced Pro system, or a 5G NR Radio Access Network (RAN), may typically include at least one base station (BS), at least one UE, and one or more optional network elements that provide connection within a network. The UE may communicate with the network, such as a Core Network (CN), an Evolved Packet Core (EPC) network, an Evolved Universal Terrestrial RAN (E-UTRAN), a Next-Generation Core (NGC), a 5G Core (5GC), or an internet, via a RAN established by one or more BSs.

A UE may include, but is not limited to, a mobile station, a mobile terminal or device, or a user communication radio terminal. The UE may be a portable radio equipment that includes, but is not limited to, a mobile phone, a tablet, a wearable device, a sensor, a vehicle, or a Personal Digital Assistant (PDA) with wireless communication capability. The UE may be configured to receive and transmit signals over an air interface to one or more cells in a RAN.

The BS may be configured to provide communication services according to at least a Radio Access Technology (RAT), such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic Wideband-Code Division Multiple Access (W-CDMA), High-Speed Packet Access (HSPA), LTE, LTE-A, evolved/enhanced LTE (eLTE) that is LTE connected to 5GC, NR (often referred to as 5G), and/or LTE-A Pro. However, the scope of the present disclosure is not limited to these protocols.

The BS may include, but is not limited to, a node B (NB) in the UNITS, an evolved node B (eNB) in LTE or LTE-A, a radio network controller (RNC) in UMTS, a BS controller (BSC) in the GSM/GERAN, a next-generation eNB (ng-eNB) in an Evolved Universal Terrestrial Radio Access (E-UTRA) BS in connection with 5GC, a next-generation Node B (gNB) in the 5G-RAN (or in the 5G Access Network (5G-AN)), or any other apparatus capable of controlling radio communication and managing radio resources within a cell. The BS may serve one or more UEs via a radio interface.

The BS may provide radio coverage to a specific geographical area using a plurality of cells included in the RAN. The BS may support the operations of the cells. Each cell may be operable to provide services to at least one UE within its radio coverage.

Each cell (often referred to as a serving cell) may provide services to serve one or more UEs within its radio coverage such that each cell schedules the downlink (DL) and optionally uplink (UL) resources to at least one UE within its radio coverage for DL and optionally UL packet transmissions. The BS may communicate with one or more UEs in the radio communication system via the plurality of cells.

A cell may allocate Sidelink (SL) resources for supporting Proximity Service (ProSe), LTE SL services, and/or LTE/NR Vehicle-to-Everything (V2X) services. Each cell may have overlapped coverage areas with other cells.

In Multi-RAT Dual Connectivity (MR-DC) cases, the primary cell of a Master Cell Group (MCG) or a Secondary Cell Group (SCG) may be called a Special Cell (SpCell). A Primary Cell (PCell) may refer to the SpCell of an MCG. A Primary SCG Cell (PSCell) may refer to the SpCell of an SCG. An MCG may refer to a group of serving cells associated with the Master Node (MN), including the SpCell and optionally one or more SCells. An SCG may refer to a group of serving cells associated with the Secondary Node (SN), including the SpCell and optionally one or more SCells.

As disclosed previously, the frame structure for NR supports flexible configurations for accommodating various next-generation (e.g., 5G) communication requirements such as eMBB, mMTC, and URLLC, while fulfilling high reliability, high data rate, and low latency requirements. The Orthogonal Frequency-Division Multiplexing (OFDM) technology in 3GPP may serve as a baseline for an NR waveform. The scalable OFDM numerology, such as adaptive sub-carrier spacing, channel bandwidth, and Cyclic Prefix (CP), may also be used.

Two coding schemes are considered for NR, specifically Low-Density Parity-Check (LDPC) code and Polar Code. The coding scheme adaption may be configured based on channel conditions and/or service applications.

At least DL transmission data, a guard period, and UL transmission data should be included in a transmission time interval (TTI) of a single NR frame. The respective portions of the DL transmission data, the guard period, and the UL transmission data should also be configurable based on, for example, the network dynamics of NR. SL resources may also be provided in an NR frame to support ProSe services or V2X services. In LTE system, a TTI is a time-domain scheduling unit and is equal to 1 subframe, which is 1 millisecond (ms) in length and includes 12 or 14 symbols depending on Cyclic Prefix (CP) length. In NR system, a TTI is denoted as a slot, which includes 12 or 14 symbols depending on Cyclic Prefix (CP). A slot length may be different depending on numerology (e.g., subcarrier spacing and/or CP length). For example, for 15 kHz subcarrier spacing, 1 slot=1 ms=1 subframe. However, for 30 kHz, 1 slot=0.5 ms.

UE-side power consumption is one of a number of major design considerations for many wireless communication systems. This demand triggered various innovative techniques for achieving power saving gains in scenarios such as cellular communication and Vehicle-to-everything (V2X) communication. For example, a Connected Mode Discontinuous Reception (C-DRX) mechanism has been applied in the LTE/NR Uu interface as one of the enablers for UE-side power saving. In LTE Sidelink (SL) communication, partial sensing-based resource selection and random resource selection are introduced for reducing power consumption of, e.g., pedestrian UEs. Unfortunately, for NR (V2X) SL communication, there is not any power saving mechanism being introduced so far.

In LTE-based V2X SL communication, a Transmission (TX) UE is allowed to select a transmission resource(s) from a (pre-)configured transmission resource pool(s), for example, SL transmission mode 4 specified in the Third Generation Partnership Project (3GPP) Technical Specification (TS) 36.213, e.g., V16.0.0. Sensing-based resource selection approaches, as well as random resource selection approaches, are supported. For sensing-based resource selection, full sensing-based and partial sensing-based approaches are specified.

Random resource selection approach: a UE identifies a set of candidate resources within a resource selection window. A candidate resource is termed as a Candidate Single-Subframe Resource (CSR). A CSR defines a time-frequency resource which can be used for SL data transmission. The UE selects a CSR at random for SL data transmission, as long as the CSR does not violate UE transmission capability constraints. As an example of UE transmission capability constraints, a UE may not be able to transmit simultaneously on two specific carriers.

Full sensing-based resource selection approach: a UE identifies a set of CSRs within a resource selection window, e.g., a valid CSR set. Further, a sensing operation in a sensing window is performed. During the sensing operation, the UE may decode successfully one or multiple pieces of SL Control Information (SCI) from one or multiple other SL UEs. The received SCI may indicate its/their future transmission patterns. A CSR may be excluded from the valid CSR set if the CSR and/or its future resource reservation(s) collide with the future transmission patterns indicated by the received SCI. For subframe(s) in the sensing window that are not monitored, hypothetical SCI(s) from the subframe(s) may be assumed as received. The hypothetical SCI(s) is used to derive potential future transmission patterns based on Radio Resource Control (RRC) configured transmission patterns. A CSR may also be excluded from the valid CSR set if the CSR or its associated future resource reservation(s) collides with the potential future transmission patterns associated with the hypothetical SCI(s). The UE may select at random a CSR from the valid CSR set.

Partial sensing-based resource selection approach: within a resource selection window, a UE may select Y subframes from the resource selection window. The value of Y may be equal to or larger than a (pre-)configured number. CSRs associated with the selected Y subframes may constitute a valid CSR set. Further, a sensing operation in a sensing window is performed. The sensing operation makes sure that at least a subset of subframes in the sensing window, which is derived based on at least the Y subframes and an information signal from the Network (NW), will be sensed. During the sensing operation, the UE may decode successfully one or multiple pieces of SCI from one or multiple other SL UEs. The received SCI may indicate its/their future transmission patterns. A CSR is excluded from the valid CSR set if the CSR and its future resource reservation(s) collides with the future transmission patterns indicated by the received SCI. The UE may select at random a CSR from the valid CSR set.

In Release 16 (Rel-16) NR SL communication, a TX UE is also allowed to select by itself a transmission resource(s) from a (pre-)configured transmission resource pool(s) based on resource allocation mode-2, as specified in, e.g., TS 38 series V16.1.0. There, only full sensing-based resource selection is supported now.

FIG. 1 illustrates a process of full sensing-based resource selection, according to an implementation of the present disclosure. Assuming a resource selection triggered by a UE's higher layer (for example, RRC layer or Media Access Control (MAC) sublayer) at slot $t_n$ (where time point n is located), a (resource) selection window 104 is defined as the time duration $[n+T_1, n+T_2]$ and a sensing window 102 is defined as the time duration $[n-T_0, n-T_{proc,0}]$, where $T_0$ is a time point configured by, e.g., RRC signaling;

$T_{proc,0}$ is specified in the TS 38 series specifications to take into account the UE-processing time;

$T_1$ may be up to UE implementation but subject to the constraint: $0<T_1<T_{proc,1}$, where $T_{proc,1}$ is specified in the TS 38 series specifications to take into account the UE-processing time; and $T_2$ may be up to UE implementation but subject to the following constraints:

$T_{2min}(prio_{TX}) \leq T_2 \leq$ remaining Packet Delay Budget (PDB), if remaining $PDB > T_{2min}(prio_{TX})$, where $T_{2min}(prio_{TX})$ may be indicated by the NW and may be related to the priority level associated with the resource selection trigger. There may be only one priority level and thus $T_{2min}$ is simply a scalar, not a vector; and $T_2$=remaining PDB, if remaining $PDB < T_{2min}(prio_{TX})$.

Similar to LTE V2X full sensing principles, a valid Candidate Single-slot Resource (CSR) set may be derived for resource selection/reservation in NR. As a result of a resource selection trigger, a set of semi-persistent resources may be selected as illustrated in FIG. 1, with the interval between the semi-persistent resources denoted as resource reservation interval 106. For each semi-persistent resource (e.g., each of semi-persistent resource 110, semi-persistent resource 120, and semi-persistent resource 130), a few associated retransmission resources of the same size may also be reserved during the selection. The retransmission resources are used for retransmission of a Transport Block(s) (TB(s)).

DRX Operation in NR Uu Interference

A UE may be configured with a DRX functionality that controls the UE's Physical Downlink Control Channel (PDCCH) monitoring activity. When in the RRC CONNECTED state, the UE does not have to continuously monitor PDCCH when DRX is configured.

Figure 8:
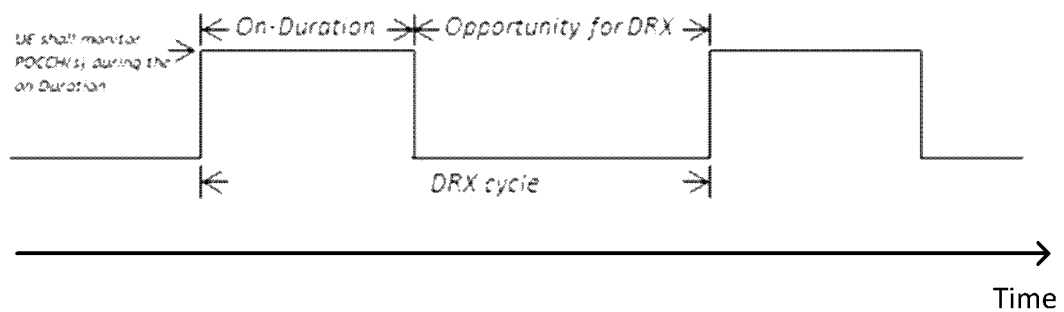
FIG. 8 illustrates an example DRX operation, according to an implementation of the present disclosure.

A DRX operation may be determined by the following factors (1) to (4):

(1) on-duration: duration that the UE waits for, after waking up, to receive PDCCHs. If the UE successfully decodes a PDCCH, the UE stays awake and (re)starts the inactivity-timer;

(2) inactivity-timer: duration that the UE waits to successfully decode a PDCCH, from the last successful decoding of a PDCCH, failing which it can go back to sleep. The UE shall restart the inactivity timer following a single successful decoding of a PDCCH for a first transmission only (e.g., not for retransmissions);

(3) RetransmissionTimer: duration until a (HARQ) retransmission can be expected;

(4) cycle: specifies the periodic repetition of the on-duration followed by a possible period of inactivity;

(5) active-time: total duration that the UE monitors PDCCH(s). This includes the "on-duration" of the DRX cycle, the time UE is performing continuous reception while the inactivity-timer has not expired, and the time when the UE is performing continuous reception while waiting for a retransmission opportunity, as illustrated in FIG. 8. FIG. 8 illustrates an example DRX operation, according to an implementation of the present disclosure.

An example UE behavior of the DRX operation is shown in Table 1.

TABLE 1

The MAC entity may be configured by RRC with a DRX functionality that controls the UE's PDCCH monitoring activity for the MAC entity's C-RNTI, CS-RNTI, INT-RNTI, SFI-RNTI, SP-CSI-RNTI, TPC-PUCCH-RNTI, TPC-PUSCH-RNTI, and TPC-SRS-RNTI. When using DRX operation, the MAC entity shall also monitor PDCCH according to requirements found in other clauses of this specification. When in RRC_CONNECTED, if DRX is configured, for all the activated Serving Cells, the MAC entity may monitor the PDCCH discontinuously using the DRX operation specified in this clause; otherwise the MAC entity shall monitor the PDCCH as specified in TS 38.213.
RRC controls DRX operation by configuring the following parameters:
- drx-onDurationTimer: the duration at the beginning of a DRX Cycle;
- drx-SlotOffset: the delay before starting the drx-onDurationTimer;
- drx-InactivityTimer: the duration after the PDCCH occasion in which a PDCCH indicates a new UL or DL transmission for the MAC entity;
- drx-RetransmissionTimerDL (per DL HARQ process except for the broadcast process): the maximum duration until a DL retransmission is received;
- drx-RetransmissionTimerUL (per UL HARQ process): the maximum duration until a grant for UL retransmission is received;
- drx-LongCycleStartOffset: the Long DRX cycle and drx-StartOffset which defines the subframe where the Long and Short DRX Cycle starts;
- drx-ShortCycle (optional): the Short DRX cycle;
- drx-ShortCycleTimer (optional): the duration the UE shall follow the Short DRX cycle;
- drx-HARQ-RTT-TimerDL (per DL HARQ process except for the broadcast process): the minimum duration before a DL assignment for HARQ retransmission is expected by the MAC entity;
- drx-HARQ-RTT-TimerUL (per UL HARQ process): the minimum duration before a UL HARQ retransmission grant is expected by the MAC entity.
When a DRX cycle is configured, the Active Time includes the time while:
- drx-onDurationTimer or drx-InactivityTimer or drx-RetransmissionTimerDL or drx-RetransmissionTimerUL or ra-ContentionResolutionTimer is running; or
- a Scheduling Request is sent on PUCCH and is pending; or
- a PDCCH indicating a new transmission addressed to the C-RNTI of the MAC entity has not been received after successful reception of a Random Access Response for the Random Access Preamble not selected by the MAC entity among the contention-based Random Access Preamble.
When DRX is configured, the MAC entity shall:
  1> if a MAC PDU is received in a configured downlink assignment:
    2> start the drx-HARQ-RTT-TimerDL for the corresponding HARQ process in the first symbol after the end of the corresponding transmission carrying the DL HARQ feedback;
    2> stop the drx-RetransmissionTimerDL for the corresponding HARQ process.
  1> if a MAC PDU is transmitted in a configured uplink grant:
    2> start the drx-HARQ-RTT-TimerUL for the corresponding HARQ process in the first symbol after the end of the first repetition of the corresponding PUSCH transmission;
    2> stop the drx-RetransmissionTimerUL for the corresponding HARQ process.
  1> if a drx-HARQ-RTT-TimerDL expires:
    2> if the data of the corresponding HARQ process was not successfully decoded:
      3> start the drx-RetransmissionTimerDL for the corresponding HARQ process in the first symbol after the expiry of drx-HARQ-RTT-TimerDL.
  1> if a drx-HARQ-RTT-TimerUL expires:
    2> start the drx-RetransmissionTimerUL for the corresponding HARQ process in the first symbol after the expiry of drx-HARQ-RTT-TimerUL.

TABLE 1-continued

```
1>    if a DRX Command MAC CE or a Long DRX Command MAC CE is received:
  2>    stop drx-onDurationTimer;
  2>    stop drx-InactivityTimer.
1>    if drx-InactivityTimer expires or a DRX Command MAC CE is received:
  2>    if the Short DRX cycle is configured:
    3>   start or restart drx-ShortCycleTimer in the first symbol after the expiry of drx-
           InactivityTimer or in the first symbol after the end of DRX Command MAC CE
           reception;
    3>   use the Short DRX Cycle.
  2>    else:
    3>   use the Long DRX cycle.
1>    if drx-ShortCycleTimer expires:
  2>    use the Long DRX cycle.
1>    if a Long DRX Command MAC CE is received:
  2>    stop drx-ShortCycleTimer;
  2>    use the Long DRX cycle.
1>    if the Short DRX Cycle is used, and [(SFN × 10) + subframe number] modulo (drx-
      ShortCycle) = (drx-StartOffset) modulo (drx-ShortCycle); or
1>    if the Long DRX Cycle is used, and [(SFN × 10) + subframe number] modulo (drx-
      LongCycle) = drx-StartOffset:
  2>    start drx-onDurationTimer after drx-SlotOffset from the beginning of the subframe.
1>    if the MAC entity is in Active Time:
  2>    monitor the PDCCH as specified in TS 38.213 [6];
  2>    if the PDCCH indicates a DL transmission:
    3>   start the drx-HARQ-RTT-TimerDL for the corresponding HARQ process in the first
           symbol after the end of the corresponding transmission carrying the DL HARQ
           feedback;
    3>   stop the drx-RetransmissionTimerDL for the corresponding HARQ process.
  2>    if the PDCCH indicates a UL transmission:
    3>   start the drx-HARQ-RTT-TimerUL for the corresponding HARQ process in the first
           symbol after the end of the first repetition of the corresponding PUSCH transmission;
    3>   stop the drx-RetransmissionTimerUL for the corresponding HARQ process.
  2>    if the PDCCH indicates a new transmission (DL or UL):
    3>   start or restart drx-InactivityTimer in the first symbol after the end of the PDCCH
           reception.
1>    in current symbol n, if the MAC entity would not be in Active Time considering
      grants/assignments/DRX Command MAC CE/Long DRX Command MAC CE received
      and Scheduling Request sent until 4 ms prior to symbol n when evaluating all DRX
      Active Time conditions as specified in this clause:
  2>    not transmit periodic SRS and semi-persistent SRS defined in TS 38.214 [7];
  2>    not report CSI on PUCCH and semi-persistent CSI on PUSCH.
1>    if CSI masking (csi-Mask) is setup by upper layers:
  2>    in current symbol n, if drx-onDurationTimer would not be running considering
      grants/assignments/DRX Command MAC CE/Long DRX Command MAC CE received
      until 4 ms prior to symbol n when evaluating all DRX Active Time conditions as
      specified in this clause:
    3>   not report CSI on PUCCH.
Regardless of whether the MAC entity is monitoring PDCCH or not, the MAC entity transmits
HARQ feedback, aperiodic CSI on PUSCH, and aperiodic SRS defined in TS 38.214 [7] when such
is expected.
The MAC entity needs not to monitor the PDCCH if it is not a complete PDCCH occasion (e.g.,
the Active Time starts or ends in the middle of a PDCCH occasion).
```

Regarding a DRX Command MAC CE, it may be identified by a MAC subheader with a Logical Channel Identifier (LCID). It has a fixed size of zero bits.

Regarding a Long DRX Command MAC CE, it may be identified by a MAC subheader with LCID. It has a fixed size of zero bits.

A DRX configuration may refer to an Information Element (IE) denoted as, e.g., DRX-Config, which may be used to configure one or more DRX-related parameters. An example of the IE DRX-Config, which is represented by Abstract Syntax Notation One (ASN.1), is shown in Table 2.

TABLE 2

```
ASN1START
-- TAG-DRX-CONFIG-START
DRX-Config ::=              SEQUENCE {
   drx-onDurationTimer         CHOICE {
                               subMilliSeconds INTEGER (1..31),
                               milliSeconds ENUMERATED {
                                 ms1, ms2, ms3, ms4, ms5, ms6, ms8, ms10, ms20, ms30, ms40,
ms50, ms60,
                                 ms80, ms100, ms200, ms300, ms400, ms500, ms600, ms800,
ms1000, ms1200,
                                 ms1600, spare8, spare7, spare6, spare5, spare4, spare3, spare2,
spare1 }
                             },
```

TABLE 2-continued

```
    drx-InactivityTimer          ENUMERATED {
                                 ms0, ms1, ms2, ms3, ms4, ms5, ms6, ms8, ms10, ms20, ms30, ms40,
ms50, ms60, ms80,
                                 ms100, ms200, ms300, ms500, ms750, ms1280, ms1920, ms2560,
spare9, spare8,
                                 spare7, spare6, spare5, spare4, spare3, spare2, spare1},
    drx-HARQ-RTT-TimerDL             INTEGER (0..56),
    drx-HARQ-RTT-TimerUL             INTEGER (0..56),
    drx-RetransmissionTimerDL        ENUMERATED {
                                 sl0, sl1, sl2, sl4, sl6, sl8, sl16, sl24, sl33, sl40, sl64, sl80, sl96, sl112,
sl128,
                                 sl160, sl320, spare15, spare14, spare13, spare12, spare11, spare10,
spare9,
                                 spare8, spare7, spare6, spare5, spare4, spare3, spare2, spare1},
    drx-RetransmissionTimerUL        ENUMERATED {
                                 sl0, sl1, sl2, sl4, sl6, sl8, sl16, sl24, sl33, sl40, sl64, sl80, sl96, sl112,
sl128,
                                 sl160, sl320, spare15, spare14, spare13, spare12, spare11, spare10,
spare9,
                                 spare8, spare7, spare6, spare5, spare4, spare3, spare2, spare1 },
    drx-LongCycleStartOffset     CHOICE {
      ms10                       INTEGER(0..9),
      ms20                       INTEGER(0..19),
      ms32                       INTEGER(0..31),
      ms40                       INTEGER(0..39),
      ms60                       INTEGER(0..59),
      ms64                       INTEGER(0..63),
      ms70                       INTEGER(0..69),
      ms80                       INTEGER(0..79),
      ms128                      INTEGER(0..127),
      ms160                      INTEGER(0..159),
      ms256                      INTEGER(0..255),
      ms320                      INTEGER(0..319),
      ms512                      INTEGER(0..511),
      ms640                      INTEGER(0..639),
      ms1024                       INTEGER(0..1023),
      ms1280                       INTEGER(0..1279),
      ms2048                       INTEGER(0..2047),
      ms2560                       INTEGER(0..2559),
      ms5120                       INTEGER(0..5119),
      ms10240                      INTEGER(0..10239)
    },
    shortDRX                     SEQUENCE {
      drx-ShortCycle                 ENUMERATED {
                                 ms2, ms3, ms4, ms5, ms6, ms7, ms8, ms10, ms14, ms16, ms20,
ms30, ms32,
                                 ms35, ms40, ms64, ms80, ms128, ms160, ms256, ms320, ms512,
ms640, spare9,
                                 spare8, spare7, spare6, spare5, spare4, spare3, spare2, spare1 },
      drx-ShortCycleTimer            INTEGER (1..16)
    }                                        OPTIONAL, -- Need R
    drx-SlotOffset               INTEGER (0..31)
}
-- TAG-DRX-CONFIG-STOP
-- ASN1STOP
``` where the definitions of the parameters described in Table 2 are shown in Table 3.

TABLE 3

DRX-Config field descriptions drx-HARQ-RTT-TimerDL
Value in number of symbols of the BWP where the transport block was received.
drx-HARQ-RTT-TimerUL
Value in number of symbols of the BWP where the transport block was transmitted.
drx-InactivityTimer
Value in multiple integers of 1 ms. ms0 corresponds to 0, ms1 corresponds to 1 ms, ms2 corresponds to 2 ms, and so on.
drx-LongCycleStartOffset
drx-LongCycle in ms and drx-StartOffset in multiples of 1 ms. If drx-ShortCycle is configured, the value of drx-LongCycle shall be a multiple of the drx-ShortCycle value.
drx-onDurationTimer
Value in multiples of 1/32 ms (subMilliSeconds) or in ms (milliSecond). For the latter, value ms1 corresponds to 1 ms, value ms2 corresponds to 2 ms, and so on.

TABLE 3-continued

DRX-Config field descriptions drx-RetransmissionTimerDL
Value in number of slot lengths of the BWP where the transport block was received. value sl0 corresponds to 0 slots, sl1 corresponds to 1 slot, sl2 corresponds to 2 slots, and so on.
drx-RetransmissionTimerUL
Value in number of slot lengths of the BWP where the transport block was transmitted. sl0 corresponds to 0 slots, sl1 corresponds to 1 slot, sl2 corresponds to 2 slots, and so on.
drx-ShortCycleTimer
Value in multiples of drx-ShortCycle. A value of 1 corresponds to drx-ShortCycle, a value of 2 corresponds to 2 * drx-ShortCycle and so on.
drx-ShortCycle
Value in ms. ms1 corresponds to 1 ms, ms2 corresponds to 2 ms, and so on.
drx-SlotOffset
Value in 1/32 ms. Value 0 corresponds to 0 ms, value 1 corresponds to 1/32 ms, value 2 corresponds to 2/32 ms, and so on.

The following may be used to further disclose terms, examples, embodiments, implementations, actions, and/or behaviors:

Beam: the term "beam" here may be replaced by "spatial filter". For example, when a UE reports a preferred gNB TX beam, the UE is essentially selecting a spatial filter used by the gNB. The term "beam information" is used to provide information about which beam/spatial filter is being used/selected. In one embodiment, individual reference signals are transmitted by applying individual beams (spatial filters). Thus, the term beam or beam information may be represented by reference signal resource index(es).

Antenna Panel: a conceptual term for a UE antenna implementation. It may be assumed that a panel is an operational unit for controlling a transmit spatial filter (beam). A panel typically includes a plurality of antenna elements. In one implementation, a beam can be formed by a panel, and in order to form two beams simultaneously, two panels are needed. Such simultaneous beamforming from multiple panels is subject to UE capability. A similar definition for "panel" may be possible by applying spatial receiving filtering characteristics.

HARQ: A Hybrid Automatic Repeat Request (HARQ) functionality ensures delivery between peer entities at Layer 1 (e.g., Physical Layer). A single HARQ process supports one Transport Block (TB) when the physical layer is not configured for downlink/uplink spatial multiplexing, and when the physical layer is configured for downlink/uplink spatial multiplexing, a single HARQ process supports one or multiple TBs. There is one HARQ entity per serving cell. Each HARQ entity supports a parallel (number) of DL and UL HARQ processes.

Timer: A MAC entity can set up one or more timers for individual purposes, for example, triggering some uplink signaling retransmission or limiting some uplink signaling retransmission period. A timer is running once it is started, until it is stopped or until it expires; otherwise, it is not running. A timer can be started if it is not running or can be restarted if it is running. A timer is always started or restarted from its initial value. The initial value can be, but is not limited to be, configured by the gNB via downlink RRC signaling.

BWP: A subset of the total cell bandwidth of a cell is referred to as a Bandwidth Part (BWP) and beamwidth part adaptation is achieved by configuring the UE with BWP(s) and telling the UE which of the configured BWPs is currently the active one. To enable Bandwidth Adaptation (BA) on the PCell, the gNB configures the UE with UL and DL BWP(s). To enable BA on SCells in case of Carrier Aggregation (CA), the gNB configures the UE with DL BWP(s) at least (e.g., there may be none in the UL). For the PCell, the initial BWP is the BWP used for initial access. For the SCell(s), the initial BWP is the BWP configured for the UE to first operate at SCell activation. The UE may be configured with a first active uplink BWP by a firstActiveUplinkBWP IE. If the first active uplink BWP is configured for an SpCell, the firstActiveUplinkBWP IE field contains the ID of the UL BWP to be activated upon performing the RRC (re-)configuration. If the field is absent, the RRC (re-)configuration does not impose a BWP switch. If the first active uplink BWP is configured for an SCell, the firstActiveUplinkBWP IE field contains the ID of the uplink bandwidth part to be used upon MAC-activation of an S Cell.

Quasi Co-Location (QCL): Two antenna ports are said to be quasi co-located if properties of the channel over which a symbol on one antenna port is conveyed can be inferred from the channel over which a symbol on the other antenna port is conveyed. The "properties of the channel" above may include Doppler shift, Doppler spread, average delay, delay spread, and spatial RX parameters. These properties are categorized into different QCL types in NR specifications. For example, QCL-TypeD refers to a spatial RX parameter. QCL-TypeD is also referred to as "beam" in this document.

Transmission Configuration Indicator (TCI) state: a TCI state contains parameters for configuring a QCL relationship between one or two DL reference signals and a target reference signal set. For example, a target reference signal set may be the DM-RS ports of PDSCH or PDCCH.

A Sidelink (SL) communication link involves at least an SL TX UE and an SL Reception (RX) UE. For power saving purposes, when an SL RX UE is not requested from monitoring SL channel activity, its associated SL TX UE(s) may not be requested/allowed to perform transmission. In this sense, an SL power saving mechanism based on a discontinuous operation (e.g., a Discontinuous Transmission and/or Reception (DTRX) operation) may involve both transmission and/or reception behavior.

Different from Uu DRX, SL DTRX operation may define both monitoring and transmission behavior for an SL control/data/feedback channel, based on similar timers as those defined for Uu DRX. To tailor for the purpose of defining SL transmission behavior, some of the timers may need to be modified to command transmission/reception behavior, instead of UL/DL in its Uu counterpart.

For example, in an SL DTRX operation, more HARQ feedback options in SL may be used than in a Uu DRX operation. In particular, for groupcast transmission, both ACK/Negative Acknowledgement (NACK) feedback and NACK-only feedback is supported. It is noted that HARQ protocol(s) in the present disclosure is referred to as an SL HARQ protocol(s), unless otherwise stated. Additionally or alternatively, in an SL DTRX operation, a single piece of SCI (or a "single SCI message") may indicate retransmission resources, in addition to current transmission resources.

Moreover, an inter-cast-group SL DTRX harmonization issue and/or an intra-cast-group SL DTRX harmonization issue may arise in an SL DTRX operation.

Inter-cast-group SL DTRX harmonization issue: a running timer may result in extended active time which is triggered by a specific cast group, while other cast groups may be in off-duration. This may cause SL DTRX states between different cast groups to be different.

Intra-cast-group SL DTRX harmonization issue: with the introduction of SL HARQ NACK-only feedback, members in a same cast group may experience different SL DTRX states.

Therefore, at least some of the implementations of the present disclosure provide a control mechanism for an SL discontinuous operation to address the harmonization issue(s) described previously.

SL Discontinuous Transmission and/or Reception (DTRX) Operation

An SL DTRX control mechanism may involve at least one of the following timers (1) to (6):

(1) an on-duration timer for SL (or "OnDurationTimer-SL timer") that defines DTRX on-duration of an SL DTRX cycle. The OnDurationTimer-SL timer may start periodically based on the configuration. The OnDurationTimer-SL timer may be a per-Medium Access Control (MAC)-entity timer. The OnDurationTimer-SL timer may start at the beginning of a DTRX cycle. For example, the OnDurationTimer-SL timer may be started after an offset (e.g., a slot offset) from the beginning of the slot (of the DTRX cycle). Whether the timer should be started may be controlled by a specific indication (e.g., specific Downlink Control Information (DCI) for power saving).

(2) an inactivity timer for SL (or "InactivityTimer-SL timer") that defines additional active time after SL activity is perceived during DTRX active time. SL activity may refer to one or a combination of the following events (i) to (vi):
(i) Physical Sidelink Control Channel (PSCCH) monitor.
(ii) PSCCH transmission and/or reception.
(ii) Physical Sidelink Shared Channel (PSSCH) transmission and/or reception.
(iv) Physical Sidelink Feedback Channel (PSFCH) transmission and/or reception.
(v) SL Synchronization Signal (SS)/(Physical Broadcast Channel (PBCH) block(s) transmission, if a concerned UE is a synchronization source which transmits SL SS/PBCH block(s) repeatedly.
(vi) SL SS/PBCH block(s) monitor/reception.

In one implementation, the SL activity may be defined by PSCCH transmission, and/or PSCCH monitor.

In one implementation, the InactivityTimer-SL timer may be a per-MAC-entity timer. The InactivityTimer-SL timer may start when the SL activity associated with a corresponding MAC entity is identified. In one implementation, the InactivityTimer-SL timer may be started when the SL activity associated with the first/initial transmission of a TB(s) is identified. In one implementation, the Transport Block(s) (TB(s)) may be (re-)transmitted across multiple resource reservation periods. The first transmission of the TB(s) corresponds to a first resource reservation period in the multiple resource reservation periods. In one implementation, the TB(s) may be (re-)transmitted across multiple resource reservation periods. The first transmission of the TB(s) corresponds to all first transmissions of the multiple resource reservation periods. In one implementation, the InactivityTimer-SL timer may start in the first symbol after the end of the SL activity. In one implementation, the InactivityTimer-SL timer may start when the resource(s) for the SL activity is provided. For example, the InactivityTimer-SL timer may start when receiving an SL grant by Uu DCI signaling.

(3) a Hybrid Automatic Repeat Request (HARQ) Round Trip Time (RTT) timer for SL transmission (or "HARQ-RTT-Timer-SL-TX timer") that defines a minimum duration before a retransmission may be performed or a retransmission resource, associated with an earlier SL transmission by an SL TX UE, is granted. The RTT-TX timer here may be a per-HARQ-process timer (or "HARQ-process-specific timer," which can be utilized interchangeably in the present disclosure).

In one implementation, the HARQ-RTT-Timer-SL-TX timer may be started after an SL HARQ-ACK transmission from a peer SL RX UE of a corresponding SL transmission is expected/received. In one implementation, the HARQ-RTT-Timer-SL-TX timer may be (re-)started after the end of the corresponding SL transmission. In one implementation, the HARQ-RTT-Timer-SL-TX timer may start after the end of SL transmission on a PSCCH or a PSSCH. In one implementation, the HARQ-RTT-Timer-SL-TX timer may start at the first symbol after the end of SL transmission on a PSCCH or a PSSCH. In one implementation, the HARQ-RTT-Timer-SL-TX timer may start after the end of the SL HARQ-ACK transmission. In one implementation, the timer may start at the first symbol after the end of the SL HARQ-ACK transmission. In one implementation, the HARQ-RTT-Timer-SL-TX timer may be started if SL HARQ feedback is enabled/indicated for the SL transmission. In one implementation, the indication may be included in an SL control channel associated with the SL transmission. In one implementation, the SL HARQ feedback option may be ACK/NACK or NACK-only. In one implementation, the SL transmission associated with a TB(s) may span one or multiple resource reservation period(s) for (re-)transmissions. The ending time of the SL transmission may be determined based on the first transmission. The first transmission may be associated with the first/initial transmission in each resource reservation period. In one implementation, when the HARQ-RTT-Timer-SL-TX expires, the TX UE could (start) perform a retransmission to the RX UE. The SL transmission described previously may include transmission of a PSCCH and/or a PSSCH.

(4) a HARQ RTT timer for SL reception (or "HARQ-RTT-Timer-SL-RX timer") that defines a minimum duration before a retransmission that may be expected/received by an SL RX UE for an earlier SL transmission conducted by a peer SL TX UE. The HARQ-RTT-RX timer may be a per-HARQ-process timer. In one implementation, the HARQ-RTT-Timer-SL-RX timer may be started at the end of SL reception from the peer SL TX UE. In one implementation, the timer may be started after SL HARQ-ACK transmission of an SL reception from the peer SL TX UE. In one implementation, the HARQ-RTT-Timer-SL-RX timer may start at the first symbol after the end of the SL reception. The HARQ-RTT-Timer-SL-RX timer may be started when SL HARQ ACK/NACK feedback is indicated by, e.g., a SL control channel, or when an (SL) HARQ NACK-only feedback mode is indicated by, e.g., a SL control channel. In one implementation, the start of the HARQ-RTT-Timer-SL-RX timer may further require that the SL decoding result associated with the SL reception is not successful. The HARQ- RTT-Timer-SL-RX timer may not be started if SL HARQ feedback is disabled by, e.g., a SL control channel or SCI, or when SL NACK-only HARQ feedback is indicated and the SL decoding result associated with the SL reception is successful. A minimum configurable value of the RTT-RX timer may guarantee the decoding time needed for the SL reception. The minimum configurable value may be related to SL RX UE capability. A minimum configurable value of the RTT-RX timer may guarantee the round-trip time between TX and RX UE.

The SL transmission from the peer SL TX UE may involve one or multiple (re-)transmissions. The (re-)transmissions may span one or multiple resource reservation period(s). The ending time of SL reception is determined based on the first transmission. The first transmission may be associated with the first transmission in each resource reservation period.

(5) a retransmission timer for SL transmission (or "RetransmissionTimer-SL-TX timer") that defines a maximum duration until a retransmission is performed or a retransmission resource is granted. The RetransmissionTimer-SL-TX timer may be a per-HARQ-process timer. The RetransmissionTimer-SL-TX timer may be started when its associated RTT-TX timer expires. The TX retransmission timer may be started when an earliest PSFCH associated with a latest SL (re)transmission of a concerned HARQ process is expected/received. The RetransmissionTimer-SL-TX timer may be started if subsequent retransmission for a TB associated with the latest SL (re)transmission of a concerned HARQ process is indicated, e.g., by a higher layer. The starting of the RetransmissionTimer-SL-TX timer may further require that HARQ feedback is disabled for, e.g., the concerned HARQ process.

In one implementation, the RetransmissionTimer-SL-TX timer may be started at an offset after a new transmission is performed. In one implementation, the RetransmissionTimer-SL-TX timer may be stopped when the RetransmissionTimer-SL-TX timer associated with a same HARQ process number is running. In one implementation, the RetransmissionTimer-SL-TX timer may be stopped when the TX UE receives an Acknowledgement (ACK) from the RX UE. While the RetransmissionTimer-SL-TX timer is running, the TX UE may perform the retransmission to the RX UE. While the RetransmissionTimer-SL-TX timer is not running, the TX UE may not perform the retransmission to the RX UE.

(6) a retransmission timer for SL reception (or "RetransmissionTimer-SL-RX timer") that defines a maximum duration until a retransmission is expected/received by an SL RX UE. The retransmission-RX timer may be a per-HARQ-process timer. The RetransmissionTimer-SL-RX timer may be started when its associated RTT-RX timer expires and/or the SL decoding results associated with a latest SL reception of a concerned HARQ process are not successful. The RetransmissionTimer-SL-RX timer may be started when an earliest PSFCH associated with a latest SL reception of a concerned HARQ process is expected/transmitted. The RetransmissionTimer-SL-RX timer may be started if subsequent retransmission for a TB associated with the latest SL reception of a concerned HARQ process is indicated, e.g., by an SL control channel associated with the latest SL reception. The starting of the RetransmissionTimer-SL-RX timer may further require that HARQ feedback is disabled for, e.g., the concerned HARQ process. The RetransmissionTimer-SL-RX timer may be stopped when HARQ-RTT-Timer-SL-RX associated with a same HARQ process number is running.

The per-HARQ-process timers described above may be configured with group-specific timer values, where each per-HARQ-process timer may refer to a HARQ-RTT-Timer-SL-TX timer, a HARQ-RTT-Timer-SL-RX timer, a RetransmissionTimer-SL-TX timer, or a RetransmissionTimer-SL-RX timer.

Figure 2:
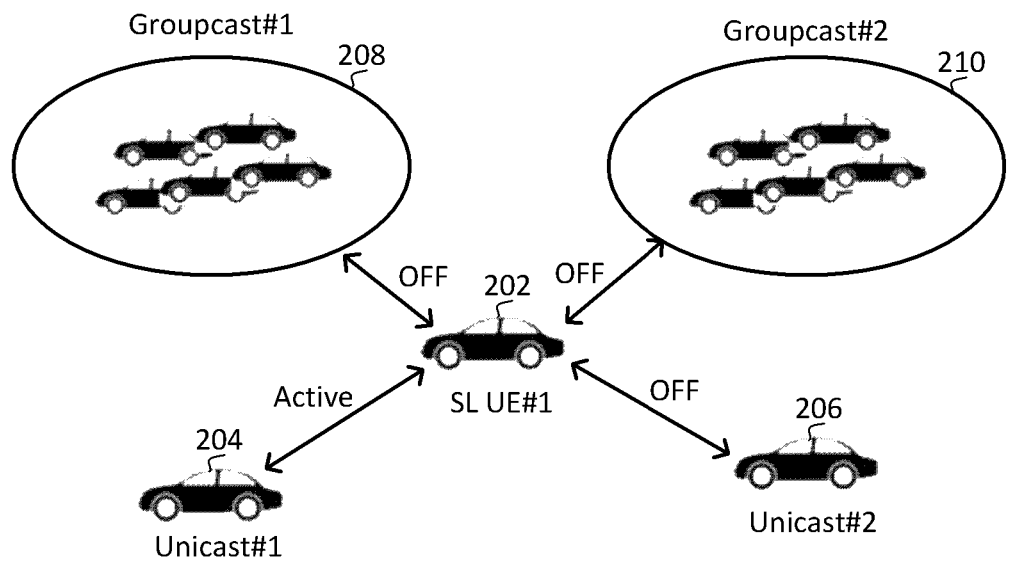
FIG. 2 illustrates an example scenario where an SL Discontinuous Transmission and/or Reception (DTRX) cycle harmonization issue arises between different cast groups for an SL UE, according to an implementation of the present disclosure.

FIG. 2 illustrates an example scenario where an SL DTRX cycle harmonization issue arises between different cast groups for an SL UE, according to an implementation of the present disclosure. As illustrated in FIG. 2, SL UE #1 202 is configured with 4 cast groups: unicast #1 (for which SL UE #1 202 performs SL communication with SL UE 204 in a unicast manner), unicast #2 (for which SL UE #1 202 performs SL communication with SL UE 206 in a unicast manner), groupcast #1 208 (for which SL UE #1 202 performs SL communication with SL UE(s) in groupcast #1 208 in a groupcast manner), and groupcast #2 210 (for which SL UE #1 202 performs SL communication with SL UE(s) in groupcast #2 210 in a groupcast manner). For each cast group, a subset of HARQ processes may be used for traffic exchange over the cast group, thus resulting in 4 subsets of HARQ processes. For each subset of HARQ processes, the timer values of the associated per-HARQ-process timers are provided/configured per group, so that a first timer value of HARQ-RTT-Timer-SL-TX timer which is associated with groupcast #1 208 may be different from a second timer value of HARQ-RTT-Timer-SL-TX timer which is associated with groupcast #2 210. It is noted that although the per-HARQ-process timers are presented as HARQ-RTT-Timer-SL-TX timers in FIG. 2, in other implementations different types of per-HARQ-process timers, e.g., per-HARQ-process inactivity timers, can be applied. In the present disclosure, an SL UE refers to a UE that is engaged in SL communication.

For an SL UE, when a configuration of SL DTRX is configured and/or activated, the SL UE is either in active time or in OFF time. The SL UE may be in active time at least when one of the following timers is running: on-duration timer (or "onDuration-Timer"), InactivityTimer-SL timer, RetransmissionTimer-SL-TX timer, and RetransmissionTimer-SL-RX timer. Otherwise, the SL UE may be in OFF time. During the SL DTRX active time, the SL UE may be required to monitor/receive or transmit a PSCCH and/or a PSSCH. In another example, during the SL DTRX active time, the SL UE may be required to monitor/receive or transmit a PSCCH and/or a PSFCH.

Inter-Cast-Group SL DTRX Harmonization

High-level wise, inter-cast-group SL DTRX harmonization may refer to SL DTRX behavior harmonization between SL UEs in different cast groups associated with an SL UE. The inter-cast-group SL DTRX harmonization issue is illustrated in , where SL UE #1 202 is configured with 2 groupcast links and 2 unicast links. From the point of view of SL UE #1 202, SL UE #1 202 is in active time due to transmission/reception activity in unicast #1 link. The active time may be the result of a running retransmission timer or a running inactivity timer in SL. However, from the point of view of SL UEs in groupcast #1 208, groupcast #2 210, and unicast #2 206, they may have entered SL DTRX off-duration due to the lack of transmission/reception activity before the expiry of an SL DTRX on-duration timer. Any transmissions/receptions to/from groupcast #1 208, groupcast #2 210, or unicast #2 206 by SL UE #1 202 may not be monitored/responded.

To prevent an SL UE from transmitting towards a cast group which may not be in active time, a group-specific prohibitor and/or an SL inactivity timer may be used.

A group-specific prohibitor may be used for, e.g., configured groups (of UEs). For example, group G_i may be in a prohibited-state when no timer(s) associated with G_i is running, or in an allowed-state when at least one timer(s) associated with G_i is running. In one implementation, the timer(s) associated with G_i is a per-HARQ-process timer (s). In another implementation, the timer(s) associated with G_i is per-group timer specific.

A per-HARQ-process timer may be a RetransmissionTimer-SL-TX timer and/or a RetransmissionTimer-SL-RX timer. An SL UE may be in active time when one of an onDuration-Timer, an InactivityTimer-SL timer, a RetransmissionTimer-SL-TX timer, and a RetransmissionTimer-SL-RX timer is running. However, group G_i of the SL UE may be in active time when it is additionally in the allowed-state. Otherwise, group G_i of the SL UE may not be in active time (e.g., when it is additionally in prohibited-state while one of {onDuration-Timer, InactivityTimer-SL, RetransmissionTimer-SL-TX, RetransmissionTimer-SL-RX} is running).

If the SL UE is in active time, but group G_i is in prohibited-state, SL activity associated with G j may not take place. An SL inactivity timer may be used to define additional active time after SL activity is perceived during active time.

As described previously, SL activity may include one or a combination of the following events (i) to (vii):
(i) PSCCH monitor.
(ii) PSCCH transmission and/or reception.
(iii) PSSCH transmission and/or reception.
(iv) PSFCH transmission and/or reception.
(v) SL SS/PBCH block(s) transmission, if a concerned UE is a synchronization source which transmits SL SS/PBCH block(s) repeatedly.
(vi) SL SS/PBCH block(s) monitor/reception.
(vii) In one implementation, PSCCH monitor, transmission, and/or reception are considered as SL activity.

An SL inactivity timer may be a per-cast-group timer, e.g., an InactivityTimer-SL-perGroup timer. The InactivityTimer-SL-perGroup timer may start when SL activity associated with a corresponding cast group of a MAC entity is identified. For example, in FIG. 2, individual inactivity timers for groupcast #1 208, groupcast #2 210, unicast #1 (including SL UE 204), and unicast #2 (including SL UE 206) may be applied. In one implementation, a cast group may be identified by a destination ID. The destination ID may be a Layer-2 ID or a Layer-1 ID that is derived from a Layer-2 ID provided by RRC signaling. In this sense, a per-group timer is specific to a corresponding destination ID.

In one implementation, the InactivityTimer-SL-perGroup timer may replace the InactivityTimer-SL timer described previously. The InactivityTimer-SL-perGroup timer and the InactivityTimer-SL timer may not exist at the same time.

In one implementation, the additional active time as a result of the InactivityTimer-SL-perGroup timer may be only applicable for a corresponding cast group.

For an SL UE, the active time for different cast groups may be different. Denote a set of HARQ process numbers used for SL transmission/reception for a cast group, G_i, by S_HARQ_i. The cast group, G_i, may be in active time when one of the following timers (1) to (4) is running.
(1) onDuration-Timer
(2) InactivityTimer-SL-perGroup G_i, which is the inactivity timer associated with the cast group G_i.
(3) RetransmissionTimer-SL-TX_G_i, which includes the SL TX retransmission timer(s) associated with HARQ process set S_HARQ_i.
(4) RetransmissionTimer-SL-RX_G_i, which includes the SL RX retransmission timer(s) associated with HARQ process set S_HARQ_i.

The SL inactivity timer may be a per-HARQ-process timer, InactivityTimer-SL-perHARQ. The InactivityTimer-SL-perHARQ may start when SL activity associated with a corresponding HARQ process number of a MAC entity is identified.

In one implementation, InactivityTimer-SL-perHARQ may replace InactivityTimer-SL.

For an SL UE, active time for different cast groups may be different. Denote a set of HARQ process numbers used for SL transmission/reception for a cast group, G_k, by S_HARQ_k. The cast group, G_i, may be in active time when one of the following timers (1) to (4) is running:
(1) onDuration-Timer;
(2) InactivityTimer-SL-perGroup G_k, which includes the inactivity timer(s) associated with HARQ process set S_HARQ_k;
(3) RetransmissionTimer-SL-TX_G_k, which includes the SL TX retransmission timer(s) associated with HARQ process set S_HARQ_k; and
(4) RetransmissionTimer-SL-RX_G_k, which includes the SL RX retransmission timer(s) associated with HARQ process set S_HARQ_k.

Intra-cast-group SL DTRX Harmonization

Intra-cast-group SL DTRX Harmonization may refer to an SL DTRX behavior harmonization between SL UEs in the same cast group.

Figure 3:
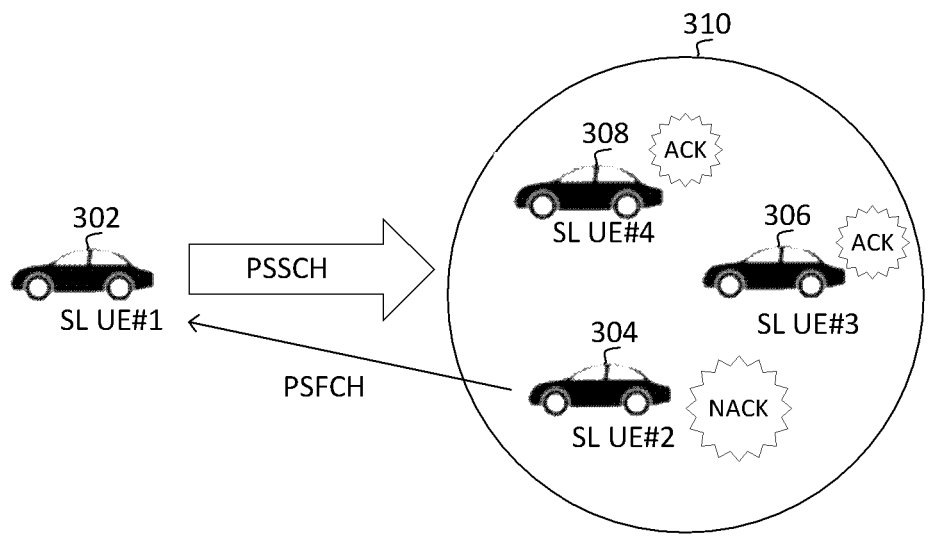
FIG. 3 illustrates an SL DTRX operation for a groupcast group operating in a Negative Acknowledgement (NACK)-only feedback mode, according to an implementation of the present disclosure.

FIG. 3 illustrates an SL DTRX operation for a groupcast group 310 operating in a NACK-only feedback mode, according to an implementation of the present disclosure. Dependent on implementation details of, e.g., the timers described previously, DTRX states of the SL UEs (e.g., SL UE #1 302, SL UE #2 304, SL UE #3 306, and SL UE #4 308) illustrated in FIG. 3 may be inconsistent. The following example provides one possible such case:

The (SL) HARQ NACK-only feedback mode is indicated for a concerned TB transmission.

The concerned TB decoding results are successful for SL UE #3 306 and SL UE #4 308, but are not successful for SL UE #2 304.

SL UE #2 starts its HARQ-RTT-Timer-RX timer after indicating a NACK in an associated PSFCH occasion/transmission. SL UE #3 306 and SL UE #4 308 do not indicate an ACK in the associated PSFCH occasion/transmission and, as a result, their respective HARQ-RTT-Timer-RX timers do not start.

SL UE #1 302 starts its HARQ-RTT-Timer-TX timer after receiving the NACK from SL UE #2 in the associated PSFCH occasion/reception.

SL UE #1 302 and SL UE #2 304 start their RetransmissionTimer-SL-TX timers and RetransmissionTimer-SL-RX timers after the respective RTT timers expire.

As a result, active time of SL UE #1 302 and SL UE #2 304 may be extended due to running their respective retransmission timers, whereas SL UE #3 306 and SL UE #4 308 may be in OFF time since their retransmission timers are not started or are stopped. It is noted that here, it is assumed that the value of inactivity timers of the SL groupcast UEs may not be configured or may be configured with a very small value. It is also possible that the transmission of the PSSCH associated with the concerned TB is not accompanied by an associated PSCCH, if supported, so that the inactivity timers of the SL group UEs are not (re-)started. Thus, further groupcast transmission initiated by either SL UE #1 302 or SL UE #2 304 may not be monitored by SL UE #3 306 and SL UE #4 308.

In one implementation, an SL UE may perform retransmission(s) associated with a failed TB if a retransmission timer associated with the failed TB is running. The retransmission timer may be a RetransmissionTimer-SL-TX timer. If the inactivity timer and/or onDuration timer is running, new TB transmission may be performed as well. If active time is extended simply due to the running retransmission timer associated with the failed TB for the SL UE, the SL UE may not expect to perform transmission and/or reception associated with a new TB. In one implementation, at least neither inactivity timer nor onDuration timer is running. In one implementation, the inactivity timer may be a group-specific timer associated with the cast group where the failed TB takes place. In one implementation, the inactivity timer may be a per-HARQ-process timer associated with the HARQ process corresponding to the failed TB.

The above may be applicable when the running retransmission timer is associated with a HARQ process whose feedback option is NACK-only.

Independent Transmission and Reception Control

NR Uu DRX may be used to define a DL control channel, e.g., PDCCH, reception/monitoring requirement. For an SL, power saving may be achieved by applying separate control for Discontinuous Reception (DRX) and Discontinuous Transmission (DTX).

For an SL UE with separate DRX/DTX control, its operation may include one or more of the following features (1) and (2):

(1) SL DRX may set behavioral restriction to one or more of the following channels (i) to (iii):
  (i) PSCCH monitoring;
  (ii) PSSCH reception associated with a PSCCH detection; and
  (iii) PSFCH transmission associated with a PSCCH/PSSCH detection.

(2) SL DRX behavioral restriction for the above channel(s) may be achieved based on the following timers (i) to (v):
  (i) an on-duration timer for SL DRX (or "OnDurationTimer-SL-DRX timer"), with its behavior similar to the description of the OnDurationTimer-SL timer. For example, the OnDurationTimer-SL-DRX timer may define a DRX on-duration of an SL DRX cycle. The OnDurationTimer-SL-DRX timer may start periodically. The OnDurationTimer-SL-DRX timer may be a per-MAC-entity timer. The OnDurationTimer-SL-DRX timer may start at the beginning of a DRX cycle. The OnDurationTimer-SL-DRX timer may be started after an offset (e.g., a slot offset) from the beginning of the slot (of the DRX cycle). Whether the timer should be started may be controlled by a specific indication (e.g., specific DCI for power saving).
  (ii) an inactivity timer for SL DRX (or "InactivityTimer-SL-DRX timer"), with its behavior similar to the description of the InactivityTimer-SL timer, the Inactivity-SL-perGroup timer, or the Inactivity-SL-per-HARQ timer. For example, the InactivityTimer-SL-DRX timer may define an additional active time period after SL activity is perceived during the DRX active time.
  (iii) a HARQ RTT timer for SL DRX (e.g., "HARQ-RTT-Timer-SL-DRX timer"), with its behavior similar to the description of the HARQ-RTT-Timer-SL-RX timer. For example, the HARQ-RTT-Timer-SL-DRX timer may define a minimum duration before a retransmission is expected/received by an SL RX UE for an earlier SL transmission conducted by a peer SL TX UE.
  (iv) a retransmission timer for SL DRX (or "RetransmissionTimer-SL-DRX timer") with its behavior similar to the description of the RetransmissionTimer-SL-RX timer. For example, the RetransmissionTimer-SL-DRX timer may define a maximum duration until a retransmission is expected/received by an SL RX UE.
  (v) a group-specific prohibitor for RX (or "Group-specific-prohibitor-RX") with its behavior similar to the description of a group-specific prohibitor, but may be further restricted to the channel behaviors mentioned in earlier bullet items, for example, PSCCH monitoring, but not PSCCH transmission.

It is noted that the analogy between the timers described in the present disclosure may be applicable with respect to SL DRX behavioral restriction.

The restriction set by SL DRX timers described in the implementation described previously ("Independent transmission and reception control") may be applied for PSCCH monitoring, PSSCH reception, or PSFCH transmission. The restriction set by SL DRX timers described in the implementation described previously ("Independent transmission and reception control") may not be applied for PSCCH transmission, PSSCH transmission, or PSFCH reception.

For an SL UE with separate DRX/DTX control, a DTX operation (or an "SL DTX behavior," which can be utilized interchangeably in the present disclosure) may include one or more of the following features (1) and (2):

(1) an SL DTX operation may set behavioral restrictions (e.g., the timing of activating/deactivating channel transmission or reception) to one or more of the following channels (i) to (iii):
  (i) PSCCH transmission;
  (ii) PSSCH transmission associated with a PSCCH transmission; and
  (iii) PSFCH reception/monitoring associated with a PSCCH/PSSCH transmission.

(2) The SL DTX behavioral restriction for the above channel(s) may be achieved based on the following timers (i) to (iv):
  (i) an on-duration timer for SL DTX (or "OnDurationTimer-SL-DTX timer"), with its behavior similar to the description of the OnDurationTimer-SL timer. In one example, there is a single OnDurationTimer for controlling the on-duration of DTX and DRX; that is, the OnDurationTimer-SL-DTX timer may be the same as the OnDurationTimer-SL-DRX timer.
  (ii) an inactivity timer for SL DTX (or "InactivityTimer-SL-DTX timer"), with its behavior similar to the description of the InactivityTimer-SL timer, the Inactivity-SL-perGroup timer, or the Inactivity-SL-per-HARQ timer.
  (iii) a HARQ RTT timer for SL DTX (or "HARQ-RTT-Timer-SL-DTX timer"), with its behavior similar to the description of the HARQ-RTT-Timer-SL-TX timer.
  (iv) a retransmission timer for SL DTX (or "RetransmissionTimer-SL-DTX timer"), with its behavior similar to the description of the RetransmissionTimer-SL-TX timer. Group-specific-prohibitor-TX with its behavior similar to the description of a group-specific prohibitor, but may be further restricted to the channel behaviors mentioned in earlier bullet items, for example, PSCCH transmission, but not PSCCH reception.

It is noted that the analogy between the timers here and the timers described previously may be applicable with respect to SL DTX behavioral restriction.

The restriction set by SL DTX timers described in the implementation described previously ("Independent transmission and reception control") may not be applied for PSCCH monitoring, PSSCH reception, or PSFCH transmission. The restriction set by SL DTX timers described in the implementation described previously ("Independent transmission and reception control") may be applied for PSCCH transmission, PSSCH transmission, or PSFCH reception.

Figure 4:
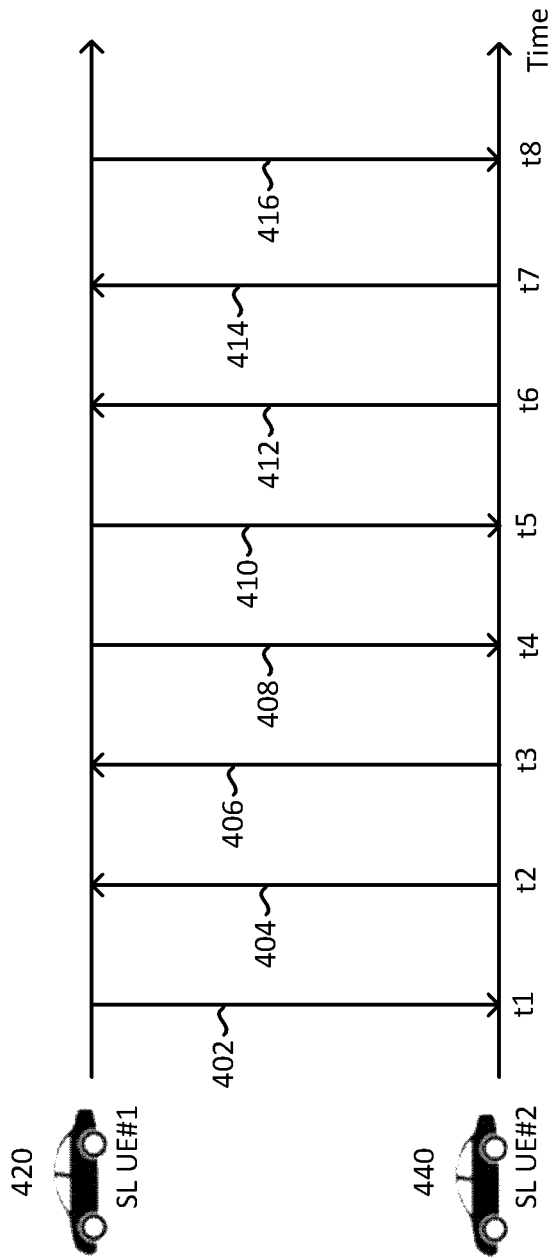
FIG. 4 illustrates a process of independent SL transmission and SL reception control, according to an implementation of the present disclosure.

FIG. 4 illustrates a process of independent SL transmission and SL reception control, according to an implementation of the present disclosure. As illustrated in FIG. 4, SL UE #1 420 and SL UE #2 440 are communicating with each other, where SL UE #1 420 performs discontinuous operations (e.g., DTRX operations) based on independent transmission and reception control.

In action 402, at time t1, SL UE #1 420 initiates a first/initial transmission of a TB #1 via a PSSCH, which may be accompanied by an associated PSCCH. Upon the TB #1 transmission, a first RTT timer, e.g., HARQ-RTT-Timer-SL-DTX timer associated with a HARQ process occupied by the TB #1 may be started.

In action 404, at time t2, SL UE #1 420 receives a first transmission of a TB #2 from SL UE #2 440.

In action 406, at time t3, a NACK feedback via a PSFCH associated with the first transmission of TB #1 is received by SL UE #1 420.

In action 408, at time t4, a NACK feedback via a PSFCH associated with the first transmission of TB #2 is transmitted by SL UE #1 420. A second RTT timer, e.g., HARQ-RTT-timer-SL-DRX timer associated with a HARQ process occupied by the TB #2 may be started.

Before or at time t5, the first RTT timer expires and a first reTX timer may be started.

In action 410, at time t5, a second transmission of the TB #1 is transmitted by SL UE #1 420.

Before or at time t6, the second RTT timer expires and a second retransmission timer may be started.

In action 412, at time t6, a second transmission of the TB #2 is received by SL UE #1 420.

In action 414, at time t7, an ACK feedback for the second transmission of TB #1 is received by SL UE #1 420.

In action 416, at time t8, an ACK feedback for the second transmission of TB #2 is transmitted by SL UE #1 420.

SL DRX Operation Impacts on Sensing-Based Resource Selection

A Uu interface DRX operation may set requirements on a DL reception behavior (e.g., PDCCH monitoring) in principle, but not on the transmission side. With such an operation, a UE may perform power saving by turning off some parts of its circuitry. In an SL, a DRX operation may need to set requirements on both transmission and reception directions. In this sense, the restriction may be imposed on both transmission resource pool(s) as well as reception resource pool(s). In the following, it assumes that the UE sensing behavior during DRX active time is not affected.

A sensing operation may include SL Sidelink Control Information (SCI) monitoring in a configured transmission resource pool(s) in order to learn whether some future resources are reserved by other SL UEs. Since the SL DRX operation may not require an SL UE to monitor/decode SL SCI during a DRX-off duration, the sensing results may be incomplete based on the sensing operation requirement. As a result of incomplete sensing results, there may be a resource selection restriction from transmission resource pool(s) during the SL DRX operation.

Sensing Operation During SL DRX

For an SL UE, sensing operation is related to transmission resource pool(s). From the NW configuration perspective, transmission resource pool(s) is a subset of reception resource pool(s). Ideally, if DRX and transmission resource pool(s) configuration is performed in the way so that transmission resource pool(s) resides in the period defined by DRX onDuration timer for SL, the sensing results would be complete, irrespective of a full or partial sensing approach.

Figure 5:
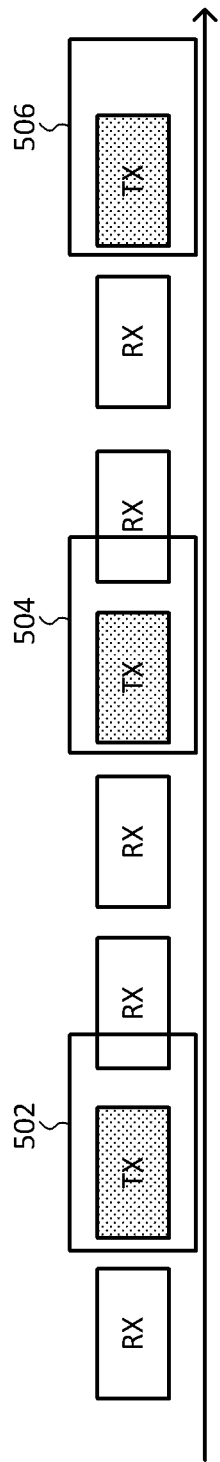
FIG. 5 illustrates a time-domain relationship between SL DRX on-duration(s) and transmission resource pool(s), according to an implementation of the present disclosure.

FIG. 5 illustrates a time-domain relationship between SL DRX on-duration(s) and transmission resource pool(s), according to an implementation of the present disclosure. As illustrated in FIG. 5, the SL DRX on-durations 502, 504 and 506 completely cover the occasions of transmission resources (each denoted as "TX" in FIG. 5) in a transmission resource pool(s) in the time domain. Therefore, the sensing operation of the UE may not be affected.

However, the scenario illustrated in FIG. 5 may rarely occur since the time domain resource (e.g., in slot granularity) may be provided in a periodic manner. For example, the indicated periodicity is 10 ms in LTE V2X resource pool indication, which makes the task of confining transmission resource pool(s) in DRX on-duration very challenging for DRX operation with long cycle duration.

Figure 6:
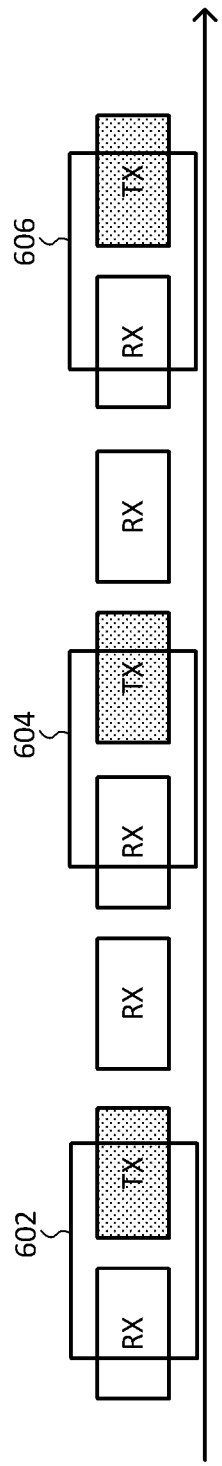
FIG. 6 is a schematic diagram illustrating a time-domain relationship between SL DRX on-duration(s) and transmission resource pool(s), according to an implementation of the present disclosure.

FIG. 6 is a schematic diagram illustrating a time-domain relationship between SL DRX on-duration(s) and transmission resource pool(s), according to an implementation of the present disclosure. As illustrated in FIG. 6, at least part of transmission opportunities (e.g., occasions of transmission resources denoted as "TX" in FIG. 6) in a period for a transmission resource pool may miss (or be out of) the SL DRX on-durations 602, 604 and 606. It is noted, while only DRX on-duration is illustrated in FIG. 6, in principle, sensing operation may work properly in the DRX active time.

To make sure that a sensing operation works properly together with SL DRX, one or a combination of the following approaches may be applied.

In one approach, the sensing operation may not be required during a DRX off-duration. If a slot is not monitored due to the DRX off-duration, it is assumed that a hypothetical SL SCI is received. All possible resource reservation patterns configured by RRC signaling are assumed for deriving possible resource reservations of the hypothetical SL SCI, and are excluded from a candidate set for resource selection.

In one approach, the sensing operation may not be required during a DRX off-duration. The UE may be provided with a threshold priority by (pre-)configuration. If a TX priority associated with a resource trigger has higher priority than the threshold priority, no hypothetical SL SCI may be assumed for slot(s) not monitored due to DRX off-duration. There may be no restriction applied for resource selection associated with the resource trigger. The resource trigger is associated with a sensing window for the sensing operation. If a TX priority associated with the resource trigger has lower priority than the threshold priority, one hypothetical SL SCI(s) may be assumed for one slot(s) not monitored due to DRX off-duration. All possible resource reservation patterns configured by RRC signaling is assumed for deriving possible resource reservations of the hypothetical SL SCI, and are excluded from a candidate set for resource selection. The threshold priority may be pre-emption priority when pre-emption is enabled by RRC.

In one approach, the sensing operation may be required on transmission resource pool(s) during a DRX off-duration. In one implementation, transmission on transmission resource pool(s) during the DRX off-duration is not required. In one implementation, one sensing timer in SL DRX operation may be introduced. When the sensing timer is running, sensing operation is required on transmission resource pool(s). Depending on different implementation examples, the sensing timer may be per MAC entity or per transmission resource pool(s). The sensing timer may be started at the first transmission resource of one transmission resource pool(s) in a period. When a DRX cycle is configured, the DRXC Active Time includes the time while the sensing timer is running. The length or the duration of the sensing timer may be the same or shorter than the length/duration of sensing window.

In one approach, when a DRX cycle is configured, the time for sensing operation (e.g., configured by the NW) is consider as DRX Active Time from the UE perspective.

Resource Selection Restriction During SL DRX

During SL DRX, once an SL initial transmission has taken place, retransmission opportunities may be guaranteed by utilizing retransmission timer and/or RTT timer as in Uu DRX. In one implementation, for selecting resource(s) in a resource selection window associated with a resource selection trigger, a resource for initial transmission of a TB may reside in active time. In one implementation, the initial transmission resource may be further constrained to be within DRX on-duration, that is, when DRX on-duration timer is running.

Resource reservation due to a resource selection trigger may include a periodic resource for, e.g., initial transmissions and their associated resources for retransmissions. Denote the periodicity of periodic resources as a Resource Reservation Period (RRP). In order to ensure transmission in each RRP, in one example, the RRP is aligned with a SL DRX cycle. In one implementation, the RRP may be the same as a SL DRX cycle. In another example, the RRP may be a multiple of SL DRX cycle.

Figure 7:
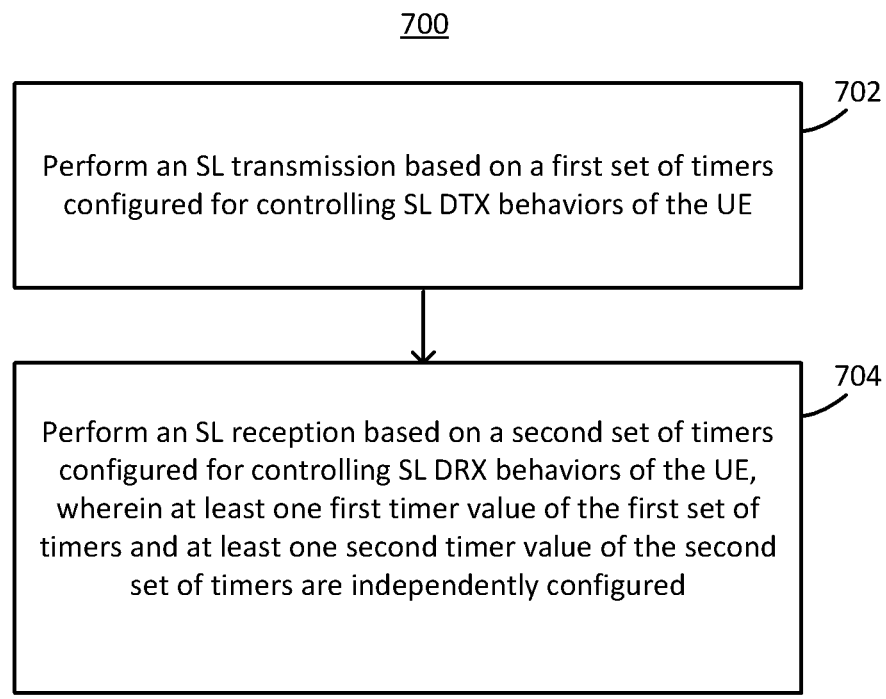
FIG. 7 illustrates a flowchart for a method for SL communication, according to an implementation of the present disclosure.

FIG. 7 illustrates a flowchart for a method 700 for SL communication, according to an implementation of the present disclosure. Although actions 702 and 704 are illustrated as separate actions represented as independent blocks in FIG. 7, these separately illustrated actions should not be construed as necessarily order dependent. The order in which the actions are performed in FIG. 7 is not intended to be construed as a limitation, and any number of the disclosed blocks may be combined in any order to implement the method, or an alternate method.

In action 702, a UE may perform an SL transmission based on a first set of timers configured for controlling SL DTX behaviors of the UE.

In action 704, the UE may perform an SL reception based on a second set of timers configured for controlling SL DRX behaviors of the UE, wherein at least one first timer value of the first set of timers and at least one second timer value of the second set of timers are independently configured. By configuring a UE with at least two sets of timers, independent DTX and DRX control can be achieved, which allows power saving effects from a transmission and a reception point of view, respectively.

In one implementation, the first set of timers may include a first on-duration timer (e.g., an onDurationTimer-SL timer), a first inactivity timer (e.g., an InactivityTimer-SL timer), a first HARQ RTT timer (e.g., a HARQ-RTT-Timer-SL-TX timer), and a first retransmission timer (e.g., a retransmissionTimer-SL-TX timer). The second set of timers may include a second on-duration timer (e.g., another onDurationTimer-SL timer), a second inactivity timer (e.g., another InactivityTimer-SL timer), a second HARQ RTT timer (e.g., a HARQ-RTT-Timer-SL-RX timer), and a second retransmission timer (e.g., a retransmissionTimer-SL-RX timer).

In one implementation, the UE may determine whether a specific timer included in the first set of timers is running, wherein the UE may be permitted to initiate a new TB transmission to a UE group operating in a HARQ NACK-only feedback mode only when the specific timer is running. The specific timer may be one of the first on-duration timer and the first inactivity timer. Taking FIG. 3 as an example, for the scenario of an SL UE communicating with a groupcast group 310 operating in a NACK-only feedback mode, the issue of OFF/active time inconsistency among SL UE #2 304, SL UE #3 306, and SL UE #4 308 may be addressed if a new SL TB transmission is allowed only when an inactivity timer or an onDuration timer is running.

In one implementation, the UE may determine a DRX state according to the first set of timers, determine a state of a prohibitor for a UE group according to at least one HARQ-process-specific timer in the first set of timers; perform the SL transmission to the UE group after determining that the DRX state is an active state and the prohibitor is in an allowed state, and prohibit from performing the SL transmission in a case that the prohibitor is in a prohibited state.

In one implementation, each of the at least one HARQ-process-specific timer may be a HARQ RTT timer or a retransmission timer.

In one implementation, each of the at least one HARQ-process-specific timer belongs to a HARQ process group.

Figure 9:
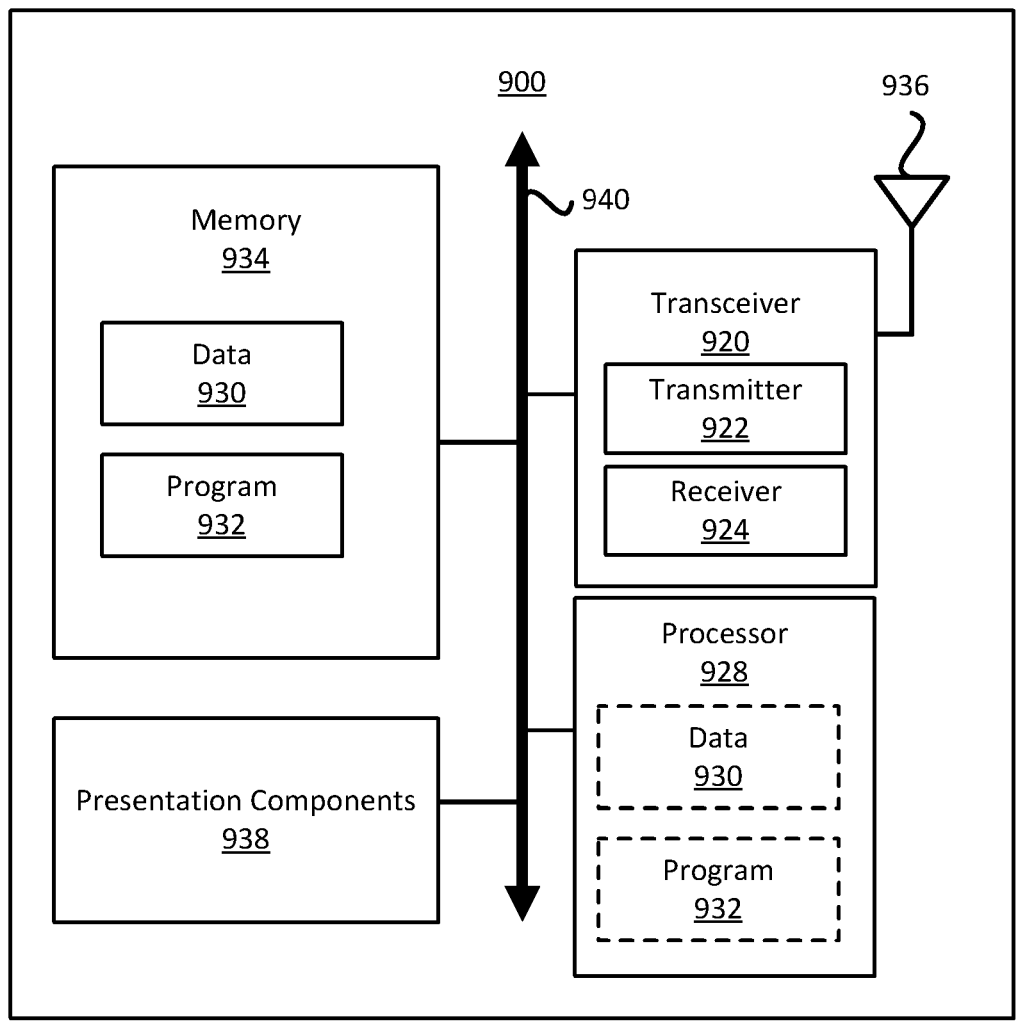
FIG. 9 is a block diagram illustrating a node for wireless communication, according to an implementation of the present disclosure.

FIG. 9 is a block diagram illustrating a node 900 for wireless communication, according to an implementation of the present disclosure. As illustrated in FIG. 9, a node 900 may include a transceiver 920, a processor 928, a memory 934, one or more presentation components 938, and at least one antenna 936. The node 900 may also include a radio frequency (RF) spectrum band module, a BS communications module, a network communications module, and a system communications management module, Input/Output (I/O) ports, I/O components, and a power supply (not illustrated in FIG. 9).

Each of the components may directly or indirectly communicate with each other over one or more buses 940. The node 900 may be a UE or a BS that performs various functions disclosed with reference to FIGS. 1 through 8.

The transceiver 920 has a transmitter 922 (e.g., transmitting/transmission circuitry) and a receiver 924 (e.g., receiving/reception circuitry) and may be configured to transmit and/or receive time and/or frequency resource partitioning information. The transceiver 920 may be configured to transmit in different types of subframes and slots including, but not limited to, usable, non-usable, and flexibly usable subframes and slot formats. The transceiver 920 may be configured to receive data and control channels.

The node 900 may include a variety of computer-readable media. Computer-readable media may be any available media that may be accessed by the node 900 and include volatile (and/or non-volatile) media and removable (and/or non-removable) media.

The computer-readable media may include computer-storage media and communication media. Computer-storage media may include both volatile (and/or non-volatile media) and removable (and/or non-removable) media implemented in any method or technology for storage of information, such as computer-readable instructions, data structures, program modules, or data.

Computer-storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer-storage media may not include a propagated data signal. Communication media may typically embody computer-readable instructions, data structures, program modules, or other data in a modulated data signal, such as a carrier wave, or other transport mechanisms and include any information delivery media.

The term "modulated data signal" may mean a signal that has one or more of its characteristics set or changed in such a manner as to encode information in the signal. Communication media may include wired media, such as a wired network or direct-wired connection, and wireless media, such as acoustic, RF, infrared, and other wireless media. Combinations of any of the previously listed components should also be included within the scope of computer-readable media.

The memory 934 may include computer-storage media in the form of volatile and/or non-volatile memory. The memory 934 may be removable, non-removable, or a combination thereof. Example memory may include solid-state memory, hard drives, optical-disc drives, etc. As illustrated in FIG. 9, the memory 934 may store a computer-readable and/or computer-executable program 932 (e.g., software codes) that are configured to, when executed, cause the processor 928 to perform various functions disclosed herein, for example, with reference to FIGS. 1 through 8. Alternatively, the program 932 may not be directly executable by the processor 928, but may be configured to cause the node 900 (e.g., when compiled and executed) to perform various functions disclosed herein.

The processor 928 (e.g., having processing circuitry) may include an intelligent hardware device, e.g., a Central Processing Unit (CPU), a microcontroller, an ASIC, etc. The processor 928 may include memory. The processor 928 may process the data 930 and the program 932 received from the memory 934, and information transmitted and received via the transceiver 920, the baseband communications module, and/or the network communications module. The processor 928 may also process information to send to the transceiver 920 for transmission via the antenna 936 to the network communications module for transmission to a CN.

One or more presentation components 938 may present data indications to a person or another device. Examples of presentation components 938 may include a display device, a speaker, a printing component, a vibrating component, etc.

In view of the present disclosure, it is obvious that various techniques may be used for implementing the disclosed concepts without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are considered in all respects as illustrative and not restrictive. It should also be understood that the present disclosure is not limited to the specific implementations disclosed. Still, many rearrangements, modifications, and substitutions are possible without departing from the scope of the present disclosure.

What is claimed is:

1. A method performed by a User Equipment (UE) for Sidelink (SL) communication, the method comprising:
    performing an SL transmission based on a first set of timers configured for controlling SL Discontinuous Transmission (DTX) behaviors of the UE;
    performing an SL reception based on a second set of timers configured for the controlling SL Discontinuous Reception (DRX) behaviors of the UE;
    determining a DRX state according to the first set of timers;
    determining a state of a prohibitor for a UE group according to at least one Hybrid Automatic Repeat Request (HARQ)-process-specific timer in the first set of timers;
    performing the SL transmission to the UE group after determining that the DRX state is an active state and the prohibitor is in an allowed state, wherein the prohibitor is in the allowed state when at least one of the at least one HARQ-process-specific timer is running; and
    refraining from performing the SL transmission to the UE group in a case that the prohibitor is in a prohibited state, wherein the prohibitor is in the prohibited state when none of the at least one HARQ-process-specific timer is running, wherein at least one first timer value of the first set of timers is independently configured relative to at least one second timer value of the second set of timers.

2. The method according to claim 1, wherein:
    the first set of timers includes:
        a first on-duration timer;
        a first inactivity timer;
        a first HARQ Round Trip Time (RTT) timer; and
        a first retransmission timer; and, wherein:
    the second set of timers includes:
        a second on-duration timer;
        a second inactivity timer;
        a second HARQ RTT timer; and
        a second retransmission timer.

3. The method according to claim 1, further comprising:
    determining whether a specific timer included in the first set of timers is running, wherein
    the UE is permitted to initiate a new Transport Block (TB) transmission to the UE group operating in a HARQ Negative-Acknowledgement (NACK)-only feedback mode only when the specific timer is running.

4. The method according to claim 3, wherein the specific timer is one of an on-duration timer or an inactivity timer.

5. The method according to claim 1, wherein each of the at least one HARQ-process-specific timer is a HARQ Round Trip Time (RTT) timer or a retransmission timer.

6. The method according to claim 1, wherein each of the at least one HARQ-process-specific timer belongs to a HARQ process group.

7. A User Equipment (UE) for performing Sidelink (SL) communication,
    the UE comprising:
        a transceiver;
        at least one processor; and
        at least one non-transitory computer-readable medium coupled to the at least one processor and memory storing one or more computer-executable instructions that, when executed by the at least one processor, cause the UE to:

perform, by the transceiver, an SL transmission based on a first set of timers configured for controlling SL Discontinuous Transmission (DTX) behaviors of the UE;
perform, by the transceiver, an SL reception based on a second set of timers configured for the controlling SL Discontinuous Reception (DRX) behaviors of the UE;
determine a DRX state according to the first set of timers;
determine a state of a prohibitor for a UE group according to at least one Hybrid Automatic Repeat Request (HARQ)-process-specific timer in the first set of timers;
control the transceiver to perform the SL transmission to the UE group after determining that the DRX state is an active state and the prohibitor is in an allowed state, wherein the prohibitor is in the allowed state when at least one of the at least one HARQ-process-specific timer is running; and
refrain from performing the SL transmission to the UE group in a case that the prohibitor is in a prohibited state, wherein the prohibitor is in the prohibited state when none of the at least one HARQ-process-specific timer is running,
wherein at least one first timer value of the first set of timers is independently configured relative to at least one second timer value of the second set of timers.

8. The UE according to claim 7, wherein:
the first set of timers includes:
a first on-duration timer;
a first inactivity timer;
a first HARQ Round Trip Time (RTT) timer; and
a first retransmission timer; and, wherein:
the second set of timers includes:
a second on-duration timer;
a second inactivity timer;
a second HARQ RTT timer; and
a second retransmission timer.

9. The UE according to claim 7, wherein the one or more computer-executable instructions, when executed by the at least one processor, further cause the UE to:
determine whether a specific timer included in the first set of timers is running,
wherein the UE is permitted to initiate a new Transport Block (TB) transmission to the UE group operating in a HARQ Negative-Acknowledgement (NACK)-only feedback mode only when the specific timer is running.

10. The UE according to claim 9, wherein the specific timer is one of an on-duration timer and or an inactivity timer.

11. The UE according to claim 7, wherein each of the at least one HARQ-process-specific timer is a HARQ Round Trip Time (RTT) timer or a retransmission timer.

12. The UE according to claim 7, wherein each of the at least one HARQ-process-specific timer belongs to a HARQ process group.

* * * * *